Patented Mar. 16, 1954

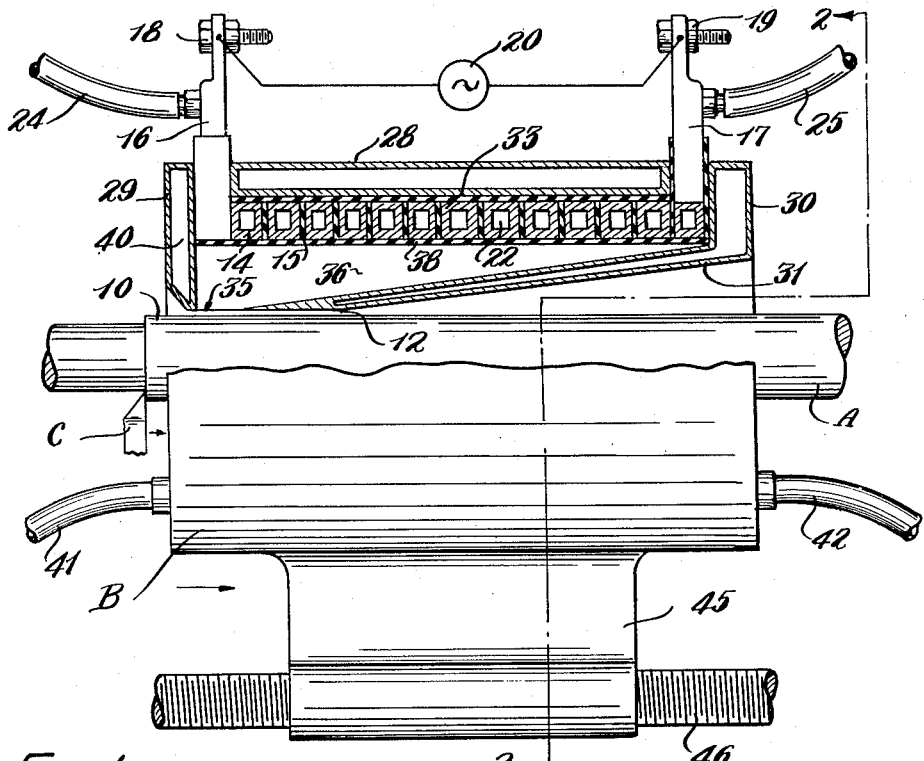
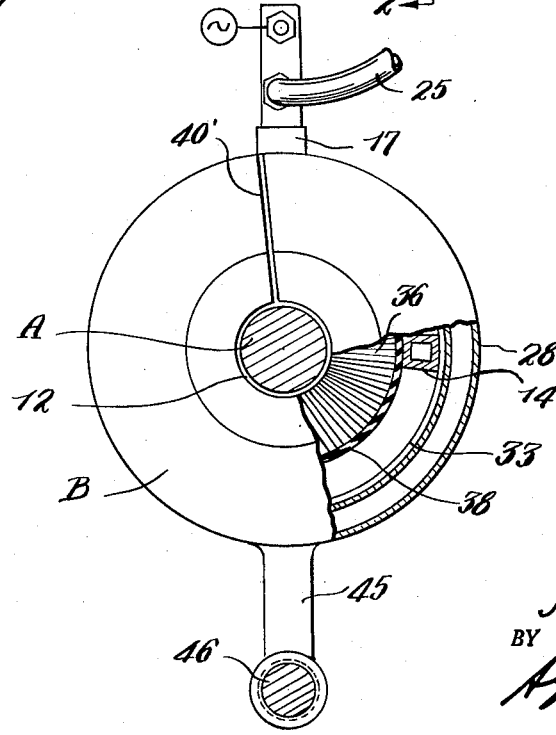

2,672,550

UNITED STATES PATENT OFFICE 2,672,550

MOVABLE INDUCTION HEAT HEAD

John T. Vaughan, Hudson, Ohio, assignor to The Ohio Crankshaft Company, Cleveland, Ohio, a corporation of Ohio Application October 6, 1950, Serial No. 188,786

5 Claims. (Cl. 219—10.79)

This invention pertains to the art of high-frequency induction heating and, more particularly, to a high-frequency inductor.

The invention is particularly applicable to inductors which are employed for the purposes of heating the surfaces of metal preparatory to removing the heated surface with a cutting tool, this type of work normally being termed "hot machining of metals." In such machining of metals, a cutting tool is progressed along the surface of the work to progressively remove narrow ribbons or bands from the surface. It is known that if this metal can be heated, prior to the machining operation, much less power is required by the machining and machining may be effected at much greater speeds. For the greatest efficiency of machining, it is necessary that a minimum volume of metal be heated which necessitates that the cutting tool be positioned very close to the high-frequency inductor.

The present invention contemplates an inductor useful in the hot machining of metals which comprises a multiturn coil and a sleevelike metallic shell enclosing the coil on the inside and outside, the shell being circumferentially split over its entire length and the portion on the interior of the coil having an axial gap where the heating of the workpiece is to be effected. The inner portion of the shell gradually tapers inwardly from one end to the gap which is positioned at the minimum interior diameter of the shell. Laminations may be placed between the coil and the interior shell to increase the over-all efficiency of the heating.

An object of the invention is a new and improved high-frequency inductor which is simple in construction, efficient in operation, which provides a maximum concentration of heating and has a minimum external magnetic field.

Another object of the invention is a new and improved high-frequency inductor comprising a multiturn coil and a metallic shell about the outside, ends and interior of the coil, the portion of the shell on the interior of the coil having an axial gap opposite which the heating is to be done.

The invention may be embodied in a number of different forms and arrangements, a preferred embodiment of which will be described in this specification and shown in the attached drawing which is a part hereof, and wherein:

Figure 1 is a side elevational view partly in section showing a high-frequency inductor embodying the present invention in heating relationship with a workpiece which is to be subsequently machined; and Figure 2 is an end view of Figure 1 taken approximately on the line 2—2 thereof.

Referring now to the drawings, Figure 1 shows an elongated round steel shaft A mounted for rotation between the centers of a suitable machine tool such as a lathe (not shown). A high-frequency inductor B embodying the present invention surrounds the shaft A to heat a narrow surface layer 10 on the shaft. The inductor B is moved from left to right in a uniform manner so that the heated band 10 will be generally continuous. A cutting tool C shown schematically is positioned just to the left of the inductor B and moves along therewith to progressively remove the heated band 10. The depth of the cutting tool C is preferably approximately that of the depth of the heating of the inductor B.

The inductor B in external appearance is generally in the form of a hollow thick-walled cylinder having a central opening or bore 12 through which the shaft A extends with preferably a minimum amount of clearance between the outer surfaces of the shaft A and the inner surfaces of the inductor B.

The inductor B shown comprises a multiturn helical coil 14 formed preferably by coiling a rectangular hollow copper tube about a mandrel of suitable size. Each turn has a thin layer of insulation 15 therebetween. Leads 16, 17 extend radially outwardly from the coil 14 and electrical terminals 18, 19 are provided thereon for connection to a suitable source of high-frequency electric current 20. The hollow conductor preferably has an interior passage 22 through which a suitable cooling medium such as water can be continuously circulated from one end of the coil to the other, cooling-water inlets and outlets being shown at 24 and 25 respectively.

The coil 14 is substantially completely encased on the interior and exterior by a hollow shell member formed of an electrically-conductive material comprising generally an outer shell 28, a left-end shell 29, a right-end shell 30 and an inner shell 31. The outer shell 28 closely surrounds the outside of the coil 14 and is insulated therefrom by a narrow layer of electrical insulation 33. Also, openings are provided therein through which the radial leads 16, 17 of the coil 14 may extend. The left-end shell 29 extends across the left end of the coil 14 and radially inwardly therefrom to define the opening or bore 12. The right-end shell 30 extends across the end of the coil 14 a minimum distance and is integrally connected with the inner shell 31 which extends from the right shell 30 toward the left on the interior of the coil 14 at an angle approaching the outer surface of the shaft A. As shown, the left end of the shell 31 terminates short of the left shell 29 to provide a gap indicated generally by the number 35.

This gap and the space between the coil 14 and the inner shell 31 is preferably filled with magnetic laminations 36. These laminations are preferably all aligned to be in radial planes through the axis of the shaft A. The laminations are pie or wedge shaped in cross section so as to completely fill the space. As shown, the inner side of the coil 14 has a layer of insulation 38 insulating the coil from the laminations.

The inner, outer and end shells preferably are of a hollow construction providing an interior passage 40 and cooling water is circulated into this passage through a hose 41 on one end of the inductor and out of the passage through a hose 42 through the other end of the inductor.

Also, the shell has a radially extending split 40' over its entire axial length. This split 40' may be positioned any place around the circumference of the shell.

In the embodiment shown, the inductor is supported in heating position by a bracket 45 through which a lead screw 46 is threaded. The lead screw 46 may form part of the machine tool (not shown) and is rotated to advance the inductor B and the cutting tool C axially along the shaft A, the inductor B heating a portion of the shaft to a limited depth and the cutting tool C removing the heated metal approximately to the depth of heating as fast as it is heated.

The inductor B shown also tends to reduce to a minimum induced heating currents in the cutting tool itself so that artificial cooling of the cutting tool is not necessary.

The inductor shown in the drawings and above described is for the purposes of illustrating the invention. Modifications and alterations will occur to others upon a reading and understanding of this specification. It is my intention to cover all modifications insofar as they come within the scope of the appended claims.

Having thus described my invention, I claim:

1. A high-frequency inductor comprising a multiturn coil of a diameter substantially greater than that of the workpiece to be heated, a shell about said coil comprising an outer shell in close spaced relationship with the outer surface of said coil and coextensive with the length thereof, first and second shells, one at each end of said coil and extending transversely relative thereto, said first end shell having a workpiece-receiving opening formed centrally thereof, said second end shell extending transversely of said coil and an inner shell extending from said second shell interiorly of said coil and on an angle toward the axis thereof, said interior shell terminating short of one of said end shells to form a gap, and laminations disposed in said gap and between said inner shell and said coil.

2. A high-frequency inductor comprising a multiturn coil of a diameter substantially greater than that of the workpiece to be heated, a shell about said coil comprising an outer shell in close spaced relationship with the outer surface of said coil and coextensive with the length thereof, first and second shells, one at each end of said coil and extending transversely relative thereto, said first end shell having a workpiece-receiving opening formed centrally thereof, said second end shell extending transversely to said coil and an inner shell extending from said second shell interiorly of said coil, said interior shell terminating short of one of said end shells to form a gap, and laminations disposed in said gap and between said inner shell and said coil.

3. A high-frequency inductor comprising a multiturn coil of a diameter substantially greater than that of the workpiece to be heated, a shell about said coil comprising an outer shell in close spaced relationship with the outer surface of said coil and coextensive with the length thereof, first and second shells, one at each end of said coil and extending transversely relative thereto, said first end shell having a workpiece-receiving opening formed centrally thereof, said second end shell extending transversely of said coil and an inner shell extending from said second shell interiorly of said coil and on an angle toward the axis thereof, said interior shell terminating short of one of said end shells to form a gap.

4. A high-frequency inductor comprising a multiturn coil of a diameter substantially greater than that of the workpiece to be heated, a shell about said coil comprising an outer shell in close spaced relationship with the outer surface of said coil and coextensive with the length thereof, a second shell at one end of said coil and extending transversely relative thereto and an inner shell extending from said second shell interiorly of said coil toward the opposite end and being generally coextensive with the length of said coil, said three shells having a circumferential gap continuous from the end of the outer shell to the end of the inner shell, said inner shell extending from said end shell on an angle toward the axis of said coil and laminations disposed in the space between said inner shell and said coil.

5. A high-frequency inductor comprising a multiturn coil of a diameter substantially greater than that of the workpiece to be heated, a shell about said coil comprising an outer shell in close spaced relationship with the outer surface of said coil and coextensive with the length thereof, first and second shells, one at each end of said coil and extending transversely relative thereto, said first end shell having a workpiece-receiving opening formed centrally thereof, said second end shell extending transversely of said coil and an inner shell extending from said second shell interiorly of said coil.

JOHN T. VAUGHAN.

References Cited in the file of this patent

UNITED STATES PATENTS

| Number | Name | Date |
|---|---|---|
| Re. 23,092 | Berliner | Mar. 22, 1949 |
| 2,005,901 | Long | June 25, 1935 |
| 2,075,622 | Nehlsen | Mar. 30, 1937 |
| 2,355,838 | Young | Aug. 15, 1944 |

FOREIGN PATENTS

| Number | Country | Date |
|---|---|---|
| 616,117 | Great Britain | Jan. 17, 1949 |
| 980,873 | France | May 18, 1951 |